(12) United States Patent
Becker et al.

(10) Patent No.: US 10,005,425 B2
(45) Date of Patent: Jun. 26, 2018

(54) SEAT-BELT WARNING DEVICE

(75) Inventors: Guido Becker, Losheim am See (DE); Thierry Mousel, Mondorf (LU); Paul Schockmel, Mamer (LU)

(73) Assignee: IEE International Electronics & Engineering S.A., Echternach (LU)

( * ) Notice: Subject to any disclaimer, the term of this patent is extended or adjusted under 35 U.S.C. 154(b) by 1690 days.

(21) Appl. No.: 10/564,607

(22) PCT Filed: Jun. 29, 2004

(86) PCT No.: PCT/EP2004/051287
§ 371 (c)(1),
(2), (4) Date: Jun. 5, 2006

(87) PCT Pub. No.: WO2005/007468
PCT Pub. Date: Jan. 27, 2005

(65) Prior Publication Data
US 2007/0085669 A1    Apr. 19, 2007

(30) Foreign Application Priority Data
Jul. 15, 2003    (EP) .................................... 03102173

(51) Int. Cl.
*B60Q 1/00*    (2006.01)
*B60R 22/48*    (2006.01)

(52) U.S. Cl.
CPC ...... *B60R 22/48* (2013.01); *B60R 2022/4816* (2013.01); *B60R 2022/4858* (2013.01); *B60R 2022/4866* (2013.01)

(58) Field of Classification Search
CPC ............ B60R 22/48; B60R 2022/4808; B60R 2022/4816; B60R 2022/485; B60R 2022/4858; B60R 2022/4866
See application file for complete search history.

(56) References Cited

U.S. PATENT DOCUMENTS

| | | | |
|---|---|---|---|
| 5,845,000 A | 1/1998 | Breed et al. | |
| 5,877,897 A * | 3/1999 | Schofield et al. | 359/604 |
| 5,940,120 A * | 8/1999 | Frankhouse et al. | 348/61 |
| 6,239,695 B1 | 5/2001 | Okada et al. | |
| 6,278,377 B1 * | 8/2001 | DeLine et al. | 340/815.4 |
| 6,329,925 B1 * | 12/2001 | Skiver et al. | 340/815.4 |
| 6,439,333 B2 * | 8/2002 | Domens et al. | 180/268 |
| 6,480,616 B1 * | 11/2002 | Hata et al. | 382/106 |
| 6,775,606 B1 * | 8/2004 | Ertl et al. | 701/49 |
| 6,961,443 B2 * | 11/2005 | Mahbub | 382/100 |
| 7,139,410 B2 * | 11/2006 | Takagi et al. | 382/103 |
| 7,140,641 B2 * | 11/2006 | Ingemarsson et al. | 280/805 |

(Continued)

OTHER PUBLICATIONS

International Search Report; PCT/EP2004/051287; dated Sep. 3, 2004.

*Primary Examiner* — Ryan Sherwin
(74) *Attorney, Agent, or Firm* — Reising Ethington P.C.

(57) ABSTRACT

The invention relates to a seat-belt warning device comprising a device which detects a seat occupied by a passenger, a device which detects whether the seat-belt associated with a seat is being used, and a device which emits a warning signal. According to the invention, the device which detects seat occupancy by a passenger comprises an optical image-producing system comprising an image evaluation unit.

6 Claims, 1 Drawing Sheet

(56) References Cited

U.S. PATENT DOCUMENTS

| | | | |
|---|---|---|---|
| 7,492,923 B2* | 2/2009 | Bothe | B60N 2/002 280/733 |
| 2002/0116106 A1* | 8/2002 | Breed et al. | 701/45 |
| 2003/0141660 A1 | 7/2003 | Colapinto et al. | |
| 2008/0131004 A1* | 6/2008 | Farmer et al. | 382/224 |

* cited by examiner

SEAT-BELT WARNING DEVICE

TECHNICAL FIELD OF THE INVENTION

The present invention relates to a safety device for a vehicle and, in particular, to a seat-belt warning device.

BRIEF DESCRIPTION OF THE RELATED ART

It is widely known that wearing a seat belt considerably increases the safety of vehicle passengers and can decidedly reduce the effects of an accident. However, seat belts which are provided are often (intentionally or unintentionally) not put on correctly. This is the case, in particular, in the back seats of the vehicle.

In order to prompt the occupants of a vehicle to put on the seat belts provided, vehicles have consequently been provided with warning systems which, when a seat belt has not been put on, output a warning signal to the respective passenger and/or the driver. It goes without saying that, in the case of such warning devices, the warning signals are intended to be output only when the respective seats are occupied by a passenger. Such a seat-belt warning device must therefore have, on the one hand, a device for determining whether the seat is occupied and, on the other hand, a device for detecting whether the associated seat belt has been put on.

U.S. Pat. No. 6,239,695 B1 describes, by way of example, a seat-belt warning system which respectively has a seat occupancy sensor and a belt lock sensor. The seat occupancy sensor comprises a pressure-sensitive membrane switch which is arranged in a seat surface of the seat to be monitored in such a manner that the pressure-sensitive membrane switch is triggered when the seat is occupied. The belt lock sensor has a switch which is arranged in the belt lock and is switched when the belt buckle is inserted into the belt lock.

The disadvantage of such a device resides in the relatively complicated cabling of the seat occupancy sensors. This requisite cabling of the sensors which are integrated in the seat constitutes a problem, in particular, in variable back-seat configurations having removable seats.

BRIEF SUMMARY OF THE INVENTION

The invention proposes an improved seat-belt warning device.

The invention provides a seat-belt warning device comprises a device for sensing whether a seat is occupied by a passenger, a device for sensing whether a seat belt associated with the seat has been put on, and a device for outputting a warning signal. According to the invention, the device for sensing whether the seat is occupied by a passenger comprises an optical imaging system having an image evaluation unit.

In contrast to the seat occupancy sensors which are known from the prior art, the optical imaging system of the proposed warning device is not integrated in the vehicle seats to be monitored. The problem of cabling when installing or removing a seat thus no longer arises in the proposed warning device. The arrangement of the warning device therefore does not stand in the way of a modular construction of a back-seat arrangement in a vehicle, for example.

The optical system may be integrated at any desired location inside the vehicle in such a manner that the seat(s) to be monitored is/are in the field of vision of the system. In this case, it should be noted that, when the optical components are suitably configured, a single optical system can be used to sense a plurality of seats by means of a single imaging system. This results, in the proposed warning device, in an economic advantage over the prior art in which each individual seat or each individual seat region of a back-seat bench has to be provided with its own seat occupancy sensor.

In one simple refinement of the invention, the optical system may be integrated, for example, in the roof lining of the vehicle. An optical system which is arranged in this manner can be used, for example, to effectively sense the entire rear region of the vehicle, with the result that it is possible to reliably detect seat occupancy of all of the rear seats of the vehicle. It should be noted that the proposed system can also be used to detect seat occupancy between the actual seats.

Another advantage of the proposed system over the prior art resides in the fact that it is possible to distinguish between an object and a person by means of suitable image evaluation. This makes it possible to classify the seat occupancy and therefore to output a warning signal, in a manner dependent on the situation, only when the seat is actually occupied by a person. This makes it possible to effectively avoid outputting a warning signal when a seat is occupied by an object.

It should be noted that the image evaluation unit may be integrated in the optical unit or may be connected to the latter via an interface. In the latter case, the space required for the optical system is reduced, with the result that integration in the vehicle is simplified. The evaluation unit itself may then be placed at any desired location in the vehicle.

The image evaluation unit and the device for sensing whether a seat belt associated with the seat has been put on are connected to a control unit which, when the seat is actually occupied and the seat belt has not been put on, drives the device for outputting a warning signal in order to output a visual and/or audible warning signal to the driver and/or the passenger in question.

In one advantageous refinement of the invention, the image evaluation unit evaluates a situation image (which has been recorded by the imaging system) using the contours and/or edges contained in said image. The edges can be determined using standard image processing methods. The edges which are determined can be used to easily distinguish between different seat occupancy states. In addition, the position of the edges and/or contours determined in the space being monitored makes it possible to determine the position of a passenger with respect to a belt lock, for example. The advantage of reducing the image contents to the existing edges and/or contours resides in the reduction in the quantity of data to be processed.

In one preferred refinement, the imaging system has a CMOS (complementary metal-oxide semiconductor) camera and/or a CCD (charge-coupled device) camera. These systems are distinguished by good resolution in conjunction with simultaneously low procurement costs.

The device for sensing whether the seat belt has been put on may comprise, for example, a belt lock sensor. One configuration of such a sensor is known from the prior art cited above. It is, for example, a switch which is integrated in the belt lock and is activated when the seat-belt tongue is inserted into the belt lock.

In one particularly preferred refinement of the invention, however, the device for sensing whether the seat belt has been put on is formed by the optical imaging system. In actual fact, when the optical system has sufficiently good resolution, it is possible to optically determine the position of a seat belt and therefore to ascertain whether the belt has or has not been put on. Such a refinement of the invention can therefore dispense with independent belt sensors. On the one hand, this reduces the number of individual components in the system, and, on the other hand, installation of the system in a vehicle is considerably simplified.

In order to simplify optical detection of the position of the seat belt, the belt may, if appropriate, have one or more markings which can be detected by the optical system.

It should be noted that, depending on the sensitivity of the optical system, the proposed device may be provided with a lighting device which allows the space which is to be monitored to be suitably illuminated when the ambient light level is not sufficient. In this case, the lighting unit may preferably be effected in a range that is not visible to the passenger, for example in the IR range.

In summary, it can be stressed that the proposed warning device makes it possible to classify, in a very precise manner, the seat occupancy of the seats being monitored and thus outputs a situation-dependent warning signal only if the present occupancy situation actually requires the seat belt to be put on. In this case, the classification (which has been carried out) of the seat occupancy can also be used to control other applications. By way of example, electric headrests may thus be automatically retracted when the rear seats of a vehicle are not occupied. When occupancy by a person is detected, headrests may also be set to a height which is suitable for the stature of the passenger.

The data regarding the seat occupancy may also be used in emergency systems in order to automatically report the number of passengers in the vehicle to an emergency center in the case of an accident, for example. In addition, the data may be stored in a vehicle data recorder in order to be used when subsequently evaluating the accident.

It should be noted that, when the seat occupancy data are stored in such a manner, storage of only the edge information is, on the one hand, advantageous. On the other hand, when the edge information is stored, it is not possible to identify the passengers in the vehicle, thus making it possible to comply with any possible data protection provisions.

BRIEF DESCRIPTION OF THE DRAWINGS

One possible arrangement of the optical system of the present invention within a vehicle is described briefly below with reference to the accompanying figures, in which.

DETAILED DESCRIPTION OF THE INVENTION

Figure 1:
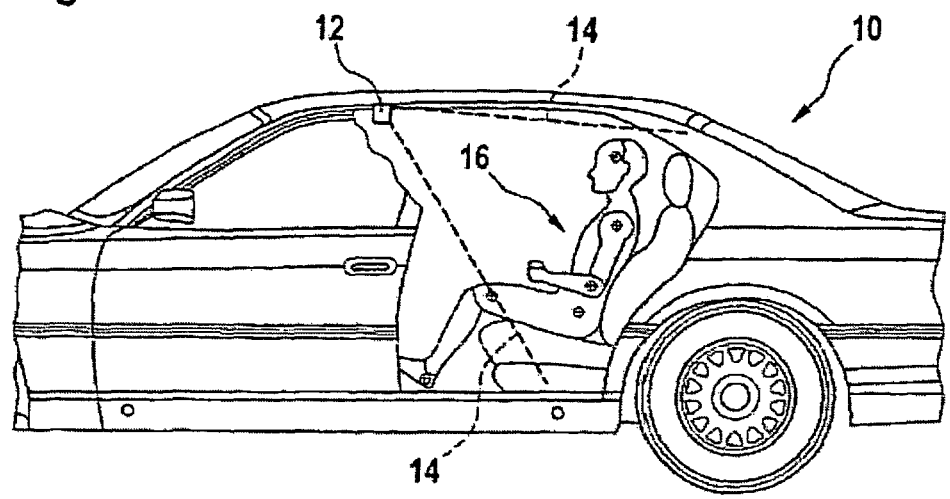
FIG. 1: shows a side view of a vehicle having a seat-belt warning device.

FIG. 1 shows a side view of a vehicle 10 having an optical system 12 arranged in the roof lining of the vehicle. The optical system, for example a CCD camera or a CMOS camera, is arranged in the vehicle in such a manner that the field of vision of the camera (indicated by the dashed lines 14) covers the entire back-seat region of the vehicle. A person 16 sitting in the back seat is therefore sensed by the camera 12 and can be detected by an image evaluation unit (not illustrated) in the situation images which are recorded by the camera. If it is also detected that the person has not put on the seat belt, a suitable warning signal is output.

Figure 2:
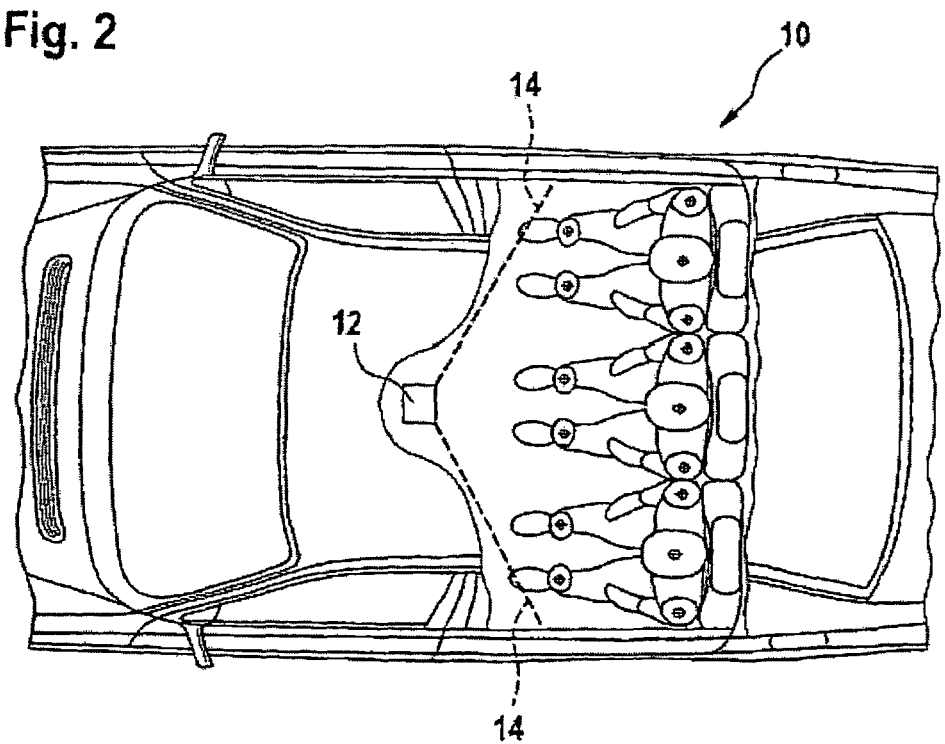
FIG. 2: shows a plan view of the vehicle shown in FIG. 1.

FIG. 2 illustrates a plan view of the vehicle 10. It can be seen that, by means of an appropriate configuration of the optical system, the viewing area 14 of the camera 12 has been widened to such an extent that the entire rear region of the vehicle can be monitored using a single camera.

The invention claimed is:

1. A seat-belt warning system comprising:
a device for sensing a seat occupancy by a passenger in a region of interest that includes a plurality of seats, said device for sensing seat occupancy comprising:
an optical imaging device configured to record a situation image using a single camera having a field of view that includes the region of interest and encompasses the plurality of seats, and
an image evaluation unit configured to evaluate the recorded situation image of the plurality of seats such that seat occupancy is detected for each of the plurality of seats in the region of interest using the situation image captured by the single camera,
a device for sensing a buckling status of a seat belt associated with said plurality of seats; and
a device structured to output a warning signal,
wherein the device for sensing a buckling status of a seat belt comprises the optical imaging device, and
wherein the seat belt has one or more markings which are detectable by the optical imaging device.

2. The seat-belt warning system as claimed in claim 1, wherein the image evaluation unit evaluates the recorded situation image on the basis of the contours and/or edges contained in said recorded situation image.

3. The seat-belt warning system as claimed in claim 2, wherein the optical imaging device comprises a CMOS (complementary metal-oxide semiconductor) camera and/or a CCD (charge-coupled device) camera.

4. The seat-belt warning system as claimed in claim 1, wherein the optical imaging device comprises a CMOS (complementary metal-oxide semiconductor) camera and/or a CCD (charge-coupled device) camera.

5. The seat-belt warning system as claimed in claim 1, wherein the device for sensing a buckling status of a seat belt comprises a belt lock sensor.

6. The seat-belt warning system as claimed in claim 1, wherein the optical imaging device comprises a lighting device for illuminating the space which is to be monitored.

* * * * *